United States Patent [19]

Sakai

[11] Patent Number: 4,638,689
[45] Date of Patent: Jan. 27, 1987

[54] HYDRAULIC LINE PRESSURE CONTROL SYSTEM FOR AN INFINITELY VARIABLE TRANSMISSION

[75] Inventor: Yasuhito Sakai, Musashino, Japan

[73] Assignee: Fuji Jukogyo Kabushiki Kaisha, Tokyo, Japan

[21] Appl. No.: 648,450

[22] Filed: Sep. 7, 1984

[30] Foreign Application Priority Data

Oct. 9, 1983 [JP] Japan ............................ 58-167272

[51] Int. Cl.$^4$ ........................................... B60K 41/14
[52] U.S. Cl. .................................... 74/866; 74/865; 74/867; 74/877
[58] Field of Search ................ 74/863, 866, 867, 865, 74/877

[56] References Cited

U.S. PATENT DOCUMENTS

| 4,161,894 | 7/1979 | Giacosa | 74/863 |
| 4,291,595 | 9/1981 | Jelaca | 74/863 |
| 4,369,675 | 1/1983 | van Deursen | 74/864 |
| 4,394,827 | 7/1983 | Kubo et al. | 74/865 X |
| 4,400,164 | 8/1983 | Cadee | 74/867 X |
| 4,458,318 | 7/1984 | Smit et al. | 74/866 X |
| 4,459,879 | 7/1984 | Miki et al. | 74/866 X |
| 4,466,521 | 8/1984 | Hattori et al. | 74/866 X |
| 4,467,674 | 8/1984 | van Deursen et al. | 74/867 |
| 4,476,746 | 10/1984 | Miki et al. | 74/866 X |
| 4,522,086 | 6/1985 | Haley | 74/867 |

Primary Examiner—Kenneth J. Dorner
Assistant Examiner—Dwight G. Diehl
Attorney, Agent, or Firm—Martin A. Farber

[57] ABSTRACT

A control system for a transmission comprising a primary pulley having a hydraulically shiftable disc, a secondary pulley having a hydraulically shiftable disc, a belt engaged with both pulleys, and a hydraulic circuit having a pump for supplying oil. A transmission ratio control valve is responsive to engine speed for controlling the oil and for shifting the disc of the primary pulley to change the transmission ratio, and a pressure regulator valve is responsive to the transmission ratio for increasing line pressure in the hydraulic circuit with increase of the transmission ratio. A throttle position sensor produces a signal in dependency on the opening degree of a throttle valve of the engine. A solenoid operated valve is responsive to the signal for operating the pressure regulator valve so as to increase the line pressure with an increase of the opening degree of the throttle valve.

9 Claims, 6 Drawing Figures

HYDRAULIC LINE PRESSURE CONTROL SYSTEM FOR AN INFINITELY VARIABLE TRANSMISSION

BACKGROUND OF THE INVENTION

The present invention relates to a control system for an infinitely variable belt-drive transmission for a vehicle. U.S. Pat. No. 4,369,675 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil pressure by shifting the spool.

The primary pulley has a Pitot pressure generating device for producing Pitot pressure dependent on engine speed. The Pitot pressure is applied to one axial end of the spool of each valve to urge the spools to shift. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve by a rod and a link.

The spool of the transmission ratio control valve is shifted in dependency on the opening degree of a throttle valve of an engine and on the engine and on the engine speed (Pitot pressure) to control the amount of oil to be supplied to the servo device of the primary pulley so as to control the transmission ratio. The spool of the oil pressure regulator valve is shifted in dependency on the engine speed and on the transmission ratio to regulate line pressure of the oil. Thus, the transmission ratio can be smoothly and infinitely varied.

In such a transmission, the belt must be tightly engaged with the primary and secondary pulleys so as not to slip on the pulleys. The engagement force of the belt with the pulleys is maintained by the line pressure regulated by the pressure regulator valve. FIG. 5 shows the relationship between the transmission ratio and the line pressure. The line pressure increases with increase of the transmission ratio (low speed range). Further, when the engine speed rises, the line pressure drops as shown by the chain line.

However, the transmission force between the pulleys and the belt is decided not only by the transmission ratio and engine speed, but by engine torque which is represented by the opening degree of the throttle valve.

Accordingly, in the prior art, the line pressure decided only by the transmission ratio and engine speed is unreliable. In order to ensure the engagement of the belt, the line pressure must be set to a high value which corresponds to a pressure to be required at full throttle. Therefore, at part-throttle, the set line pressure is excessively high for transmitting small engine torque, which means a great loss in power for driving an oil pump and excessive of fuel consumption.

SUMMARY OF THE INVENTION

The object of the present invention is to provide a controls the line pressure to its value in accordance with transmission ratio, engine speed and with engine torque.

According to the present invention, there is provided a control system for an infinitely variable transmission for transmitting the power of an internal combustion engine mounted on a vehicle, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, for hydraulic circuit having a pump for supplying oil, a transmission ratio control valve responsive to engine speed for controlling the oil and for shifting the disc of the primary pulley to change the transmission ratio, and a pressure regulator valve responsive to the transmission ratio for increasing the line pressure of the hydraulic circuit with an increase of the transmission ratio, wherein the improvement comprises:

first means for detecting the torque of said engine and for producing a control signal dependent on the engine torque;

second means responsive to said signal for operating said pressure regulator valve so as to increase the line pressure with increase of the torque.

In an aspect of the present invention, the first means comprises a throttle position sensor, and an electronic circuit responsive to a signal of the throttle position sensor for producing the control signal, and the second means comprises a hydraulic control circuit for applying a part of the drain oil to said pressure regulator valve, and a solenoid operated valve responsive to said control signal for controlling the drain oil passing through said hydraulic control circuit and for regulating the line pressure.

The other objects and features of this invention will be apparently understood from the following description with reference to the accompanying drawings.

DETAILED DESCRIPTION OF THE PREFERRED EMBODIMENT

Figure 1:
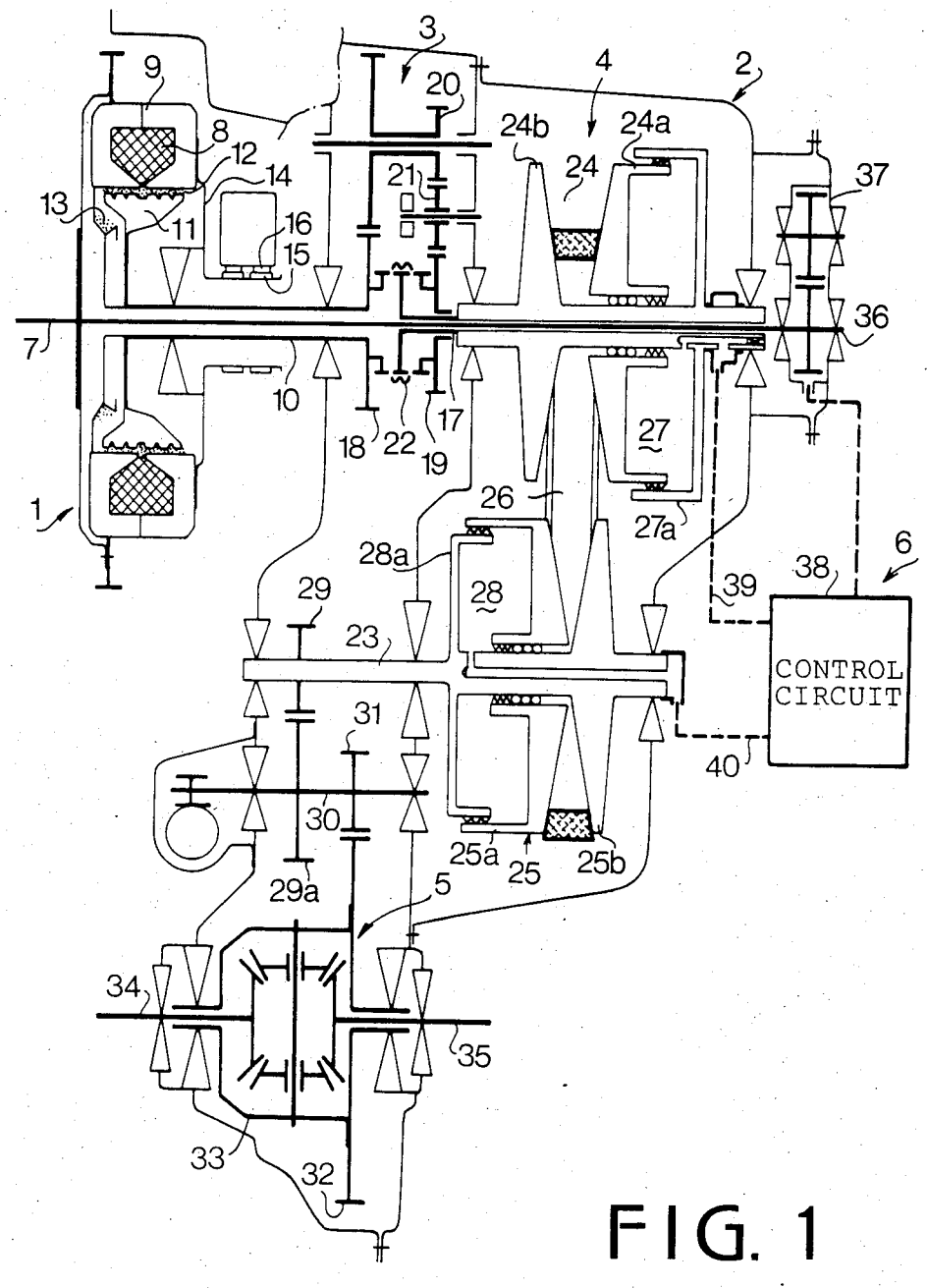
FIG. 1 is a schematic illustration of an infinitely variable belt-drive transmission.

Referring to FIG. 1, the infinitely variable belt-drive automatic transmission for a vehicle to which the present invention is applied, comprises an electromagnetic powder clutch 1, an infinitely variable belt-drive transmission 2, a selector mechanism 3, pulleys and belt device 4, final reduction device 5, and an oil control circuit 6. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and driven member 11. The powder chamber 13 is filled with powder made of magnetic material. The driven member 11 is secured to an input shaft 10 of the belt-drive transmission. A holder 14 secured to the drive member 9 carries slip rings 15 which are electrically connected to the coil 8. The coil 8 is supplied through brushes 16 and slip rings 15 with control current from a electronic control circuit.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with the input shaft 10, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged to the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through gears 18, 20, 21 and 19 to provide a reverse driving position (R range).

The main shaft 17 has an axial passage in which an oil pump driving shaft 36 connected to the crankshaft 7 is mounted. An output shaft 23 is provided in parallel with the main shaft 17. A primary pulley 24 and a secondary pulley 25 are mounted on the shafts 17 and 23 respectively. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with an oil pump 37 through a passage 39 and the control circuit 38. The oil pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and the control circuit 38. A drive belt 26 engages with the primary pulley 24 and the secondary pulley 25.

Secured to the output shaft 23 is a drive gear 29 which engages with an intermediate reduction gear 29a on an intermediate shaft 30. An intermediate gear 31 on the shaft 30 engages with a final gear 32. Rotation of the final gear 32 is transmitted to axles 34 and 35 of the vehicle, driving vehicle wheels (not shown) through a differential 33.

The pressure oil control circuit 38 is responsive to engine speed and throttle valve position for controlling the oil supply to the servo devices 27 and 28 thereby moving discs 24a and 25a. Thus, the transmission ratio is infinitely changed.

Figure 2:
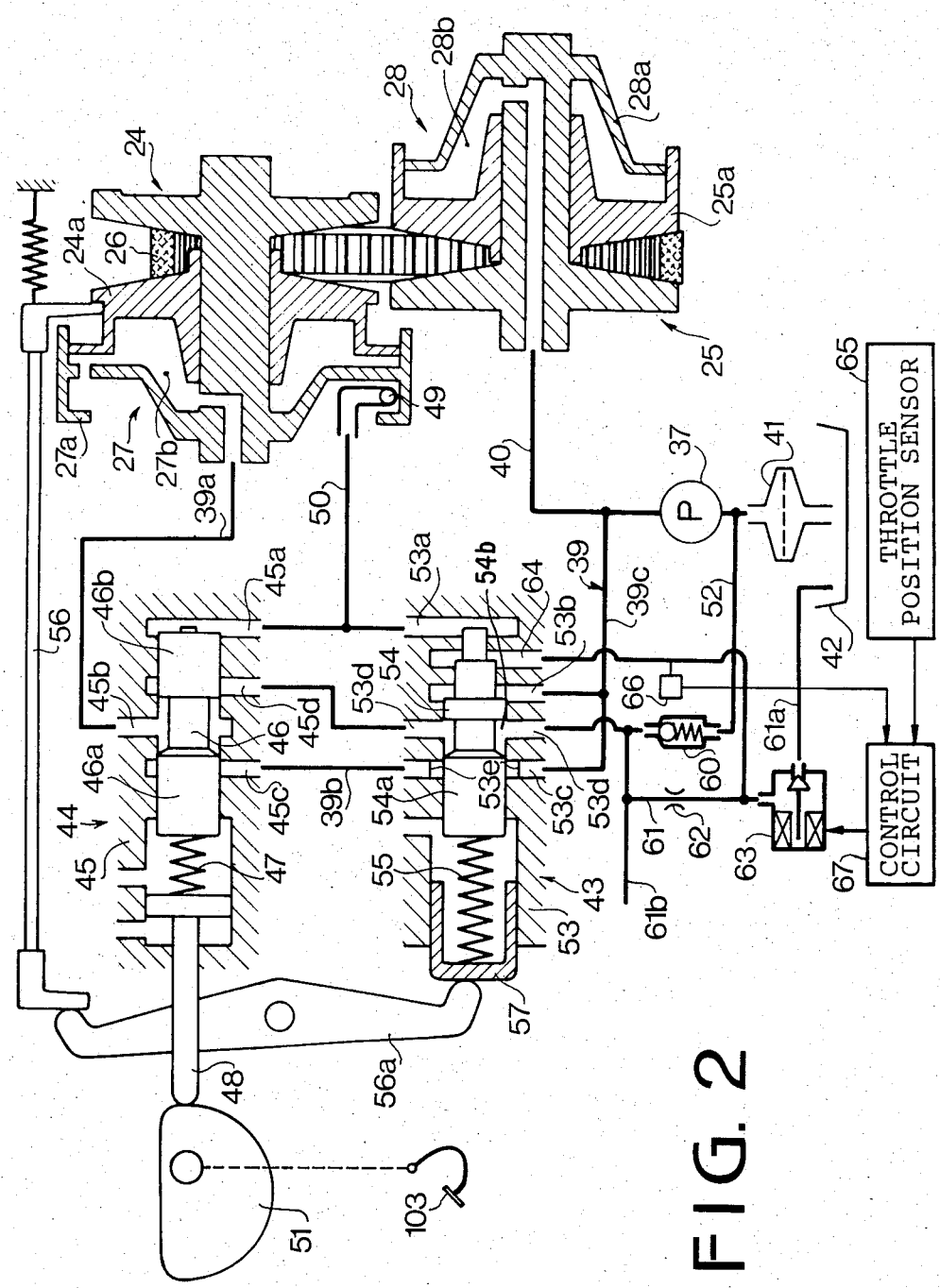
FIG. 2 is a schematic diagram showing a control system according to the present invention.

Referring to FIG. 2, a chamber 27b of the servo device 27 is applied with pressurized oil by the oil pump 37 from an oil reservoir 42 passing through a filter 41, conduit 39, pressure regulator valve 43 and transmission ratio control valve 44. A chamber 28b of the servo device 28 is applied with pressurized oil through conduit 40 without passing through the valves 43 and 44. The movable conical disc 24a is so designed that the pressure receiving area thereof is larger than that of the movable conical disc 25a.

The transmission ratio control valve 44 comprises a valve body 45, spool 46, spring 47 for urging the spool in the downshift direction, an actuating member 48 for the spool 46 and the spring 47. The actuating member 48 engages a shift cam 51. The shift cam 51 is operatively connected to an accelerator pedal 103 of the vehicle so as to be rotated in dependency on the magnitude of depression of the pedal 103. A port 45b of the valve 44 is selectively communicated with a pressure oil supply port 45c or a drain port 45d in accordance with the position of lands 46a and 46b of the spool 46. Port 45b communicates with chamber 27b through a conduit 39a, and port 45c communicates with the pressure regulator valve 43 through a conduit 39b. The drain port 45d communicates with oil reservoir 42 through a port 53d and check valve 60 and conduit 52. An end chamber 45a is applied with Pitot pressure from a Pitot pipe 49 through a passage 50.

Thus, the spool 46 is shifted in dependency on the Pitot pressure which is dependent on the engine speed and on the pressure, by the spring 47 dependent on the magnitude of depression of the pedal 103. The amount of oil supplied to the chamber 27b an increases with increase of engine speed to provide upshifting.

The pressure regulator valve 43 comprises a valve body 53, spool 54, and a spring 55 for urging the spool 54 in one direction. The spool 54 is applied with pressure of the pressure oil supplied through conduit 39 and a port 53d, so that the spool 54 is moved to the left by the oil pressure at the port 53b. One end of spring 55 engages with a slidable spring retainer 57 which is moved through an arm 56a and rod 56. The rod 56 engages the disc 24a for detecting the transmission ratio of the continuously variable transmission during operation. A port 53c connected with conduit 39c is communicated with a conduit 39b through an annular groove 53e and communicated with port 53d in accordance with the position of a land 54a and recess 54b of the valve 43.

A first end chamber 53a is applied with Pitot pressure from the Pitot pipe 49. Accordingly, the spool 54 is applied with the Pitot pressure, with the pressure applied to the chamber 53b, and with the pressure of the spring 55 dependent on the transmission ratio. When the engine speed increases, the Pitot pressure increases. Thus, the spool 54 is shifted to the left to communicate port 53c with drain port 53d via the recess 54b, so that the line pressure decreases. On the other hand, as the transmission ratio increases, the rod 56 moves to the left to rotate the arm 56a in the counterclockwise direction. Thus, the spool 54 is shifted to the right, so that the line pressure is increased.

In the system according to the present invention, a second end chamber 64 is provided adjacent to the first end chamber 53a so as to shift the spool 54 against the spring 55. In the drain passage 52, a check valve 60 is provided and a control oil passage 61 having a restrictor 62 is communicated with the drain passage 52 upstream of the check valve 60. The passage 61 is communicated with the second end chamber 64 and with the oil reservoir 42 through a solenoid operated valve 63 and a passage 61a. Further, the passage 61 is communicated with a lubricating system (not shown) of the transmission through a passage 61b.

Figure 6:
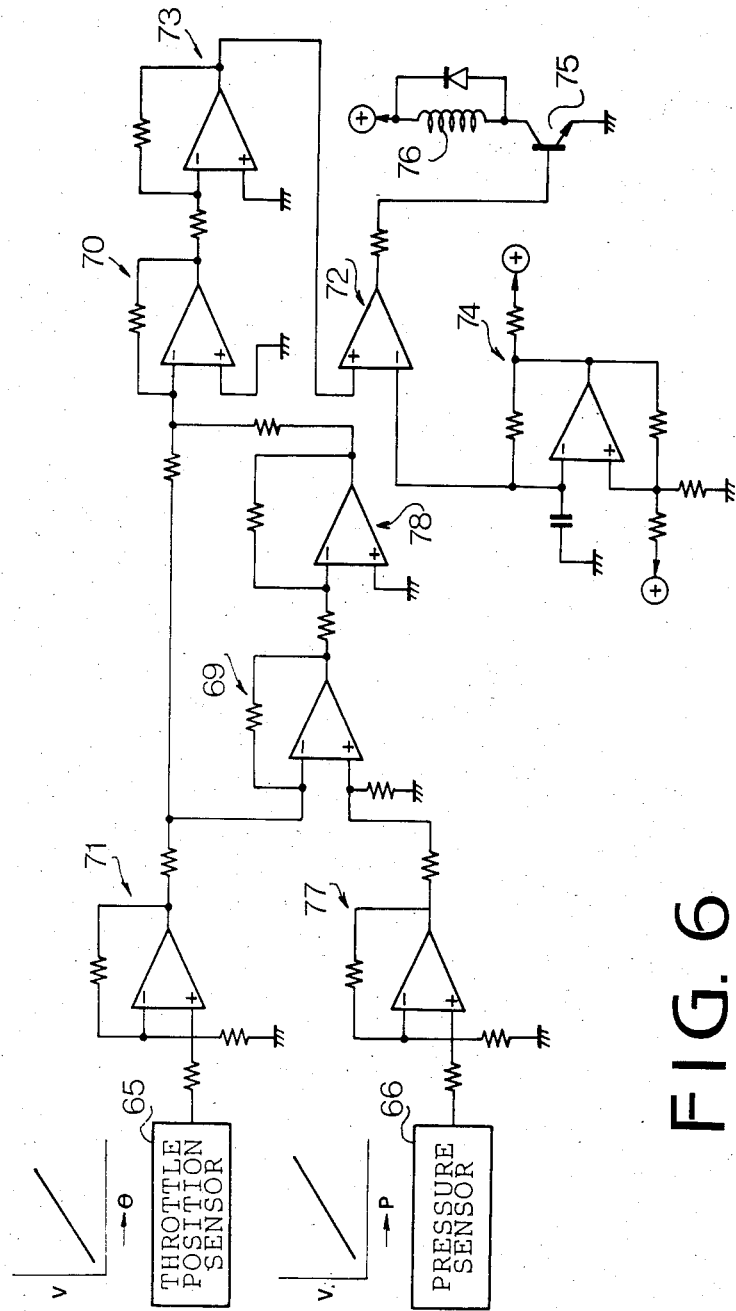
FIG. 6 is a control circuit.

Engine torque is detected, for example, by a throttle position sensor 65. Referring to FIG. 6, the output of the throttle position sensor 65 is applied through an amplifier 71 to an adding circuit 70 and a deviation detecting circuit 69 in an electric control circuit 67 (FIG. 2). On the other hand, an oil pressure sensor 66 is provided in order to detect the oil pressure in the second end chamber 64. The output of the oil pressure sensor 66 is also applied to the deviation detecting circuit 69 through an amplifier 77. The output voltage of the throttle position sensor 65 increases with an increase of the opening angle $\theta$ and the output voltage of the pressure sensor increases with an increase of the pressure P. The output of the deviation detecting circuit 69 is added to the input of the adding circuit 70 through an invertor 78. The output voltage of the adding circuit 70 is applied to a non-inverting input of a comparator 72 through an invertor 73. The inverting input of the comparator 72 is applied with a triangular pulse train from a triangular pulse generating circuit 74, so that the comparator 72 produces square wave pulses. The duty ratio of the square wave pulses increases wtih an increase of the torque as described hereinafter.

Figure 3:
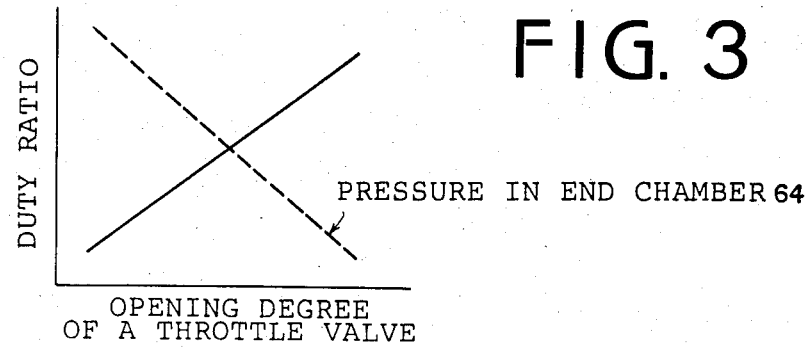
FIG. 3 is a graph showing the relationship between opening degree of a throttle valve and line pressure.

When the accelerator pedal is greatly depressed, the output voltage of the throttle position sensor 65 rises, so that the input voltage of the adding circuit 70 increases. The adding circuit 70 is also applied with the output voltage of the deviation detecting circuit 69 in addition to the output voltage of the throttle position sensor. Thus the output voltage of the adding circuit 70 drops and the output of the invertor 73 rises. Accordingly, the duty ratio of the output square wave pulses of the comparator 72 increases. FIG. 3 shows the relationship between the opening degree of the throttle valve and the duty ratio. The square wave pulses turn on and off a transistor 75, so that a coil 76 of the solenoid operated valve 63 is intermittently energized. Since the duty ratio is large, the duration of the on state of the transistor 75 is long, which means a long period of the open state of the solenoid operated valve 63. Accordingly, the pressure in the second end chamber 64 drops and is sensed by the pressure sensor 66. If there is a deviation between the inputs of the deviation detecting circuit 69, the decreasing of the oil pressure continues until the deviation disappears. Since the pressure in the second end chamber 64 decreases, the spool 54a moves to the right to decrease the flow rate of the oil flowing from the port 53c to the port 53d. Thus, the line pressure increases, so that the movably discs 24a and 25a are pressed against the belt 26. Accordingly, slipping of the belt 2 at high torque operation can be prevented.

Figure 4:
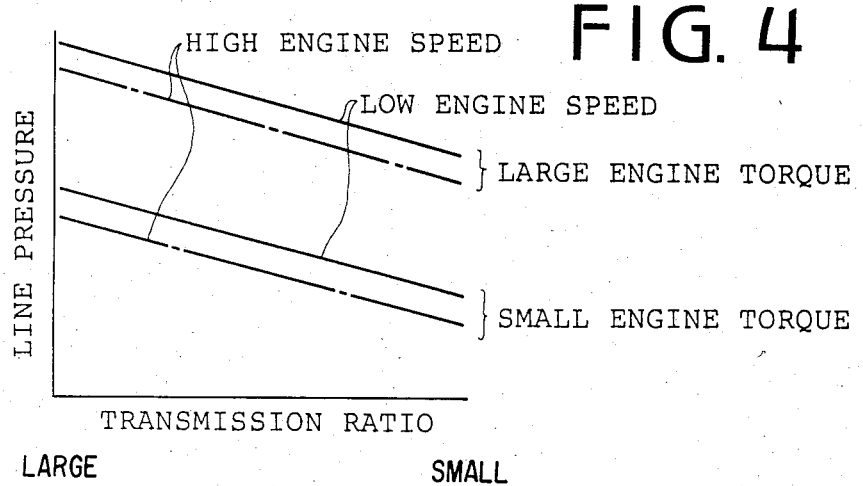
FIG. 4 is a graph showing the relationship between transmission ratio and line pressure in the present invention.
Figure 5:
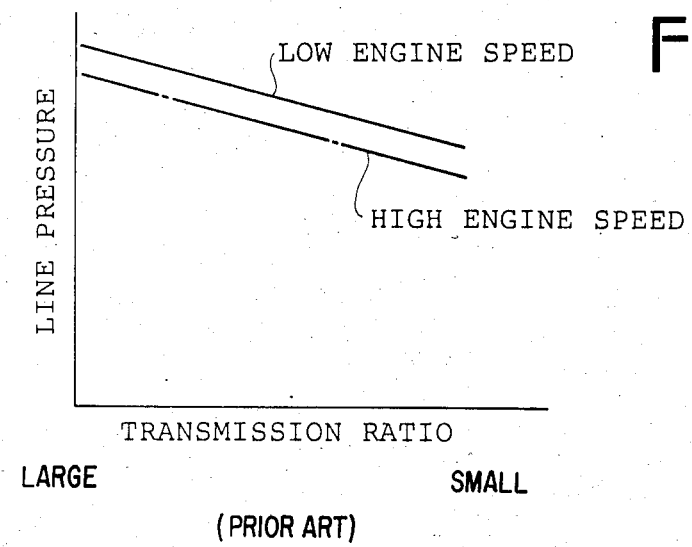
FIG. 5 is a graph showing the relationship between transmission ratio and line pressure conventional infinitely variable transmission.

FIG. 5 shows the relationship between the transmission ratio and the line pressure in a conventional control system, and FIG. 4 shows that of the present invention. In the system of the present invention, the line pressure varies with variations of the transmission ratio and engine speed together with the variation of engine torque. Thus, in accordance with the present invention, the line pressure is controlled to the necessary minimum value in dependency on the engine torque, thereby decreasing loss of the oil pump operation to decrease fuel consumption.

Although the engine torque is detected by the throttle position sensor in the above described embodiment, a pressure sensor for detecting vacuum in an intake manifold of an engine can be used for the detection of engine torque.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An improved control system for an infinitely variable transmission for transmitting the power of an internal combustion engine mounted on a vehicle, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a pump for supplying oil, a transmission ratio control valve responsive to engine speed for controlling the oil and for shifting the disc of the primary pulley to change the transmission ratio, and a pressure regulator valve responsive to the transmission ratio for increasing the line pressure of the hydraulic circuit with increase of the transmission ratio, wherein the improvement comprises:

first means comprising a throttle position sensor for detecting the torque of said engine and an electronic circuit responsive to an output signal of the throttle position sensor for producing a control signal proportional to said torque;

second means responsive to said control signal for operating said pressure regulator valve so as to increase the line pressure with increase of the torque;

said second means comprises a hydraulic control circuit for applying a part of drain oil to said pressure regulator valve and a solenoid operated valve responsive to said control signal for controlling the oil passing through said hydraulic control circuit and for regulating the line pressure;

a pressure sensor for detecting the pressure of the part of the drain oil supplied to the pressure regulator valve and connected to said electronic circuit, the latter producing said control signal further dependent on the pressure of the part of the drain oil supplied to the pressure regulator valve.

2. The control system according to claim 1, wherein said electronic circuit includes means for subtracting the deviation between a signal dependent on the signal of the throttle position sensor and a signal dependent on the pressure of the part of the drain oil supplied to the pressure regulator valve to said signal dependent on the signal of the throttle position sensor for producing an intermediate signal from which said control signal is formed.

3. The control system according to claim 2, wherein said electronic circuit includes a comparator means for comparing said intermediate signal with triangular pulses to produce said control signal.

4. The control system according to claim 1, wherein said pressure regulator valve is displaceably mounted and is formed with a recess and a surface, the latter being perpendicular to a direction of displacement of the pressure regulator valve, said hydraulic control circuit variably communicates with said hydraulic circuit at line pressure at said pressure regulator valve via said recess in the latter in a range of displaceable positions of the pressure regulator valve for receiving a variable pressure portion of oil from said hydraulic circuit, said hydraulic control circuit extends to said surface of said pressure regulator valve for biasing the latter so as to move said recess relative to said hydraulic circuit and said hydraulic control circuit.

5. The control system according to claim 1, wherein said hydraulic control circuit includes a flow restrictor upstream of said solenoid operated valve.

6. The control system according to claim 1, wherein said solenoid operated valve selectively communicates said hydraulic control circuit with an oil reservoir for the pump.

7. The control system according to claim 1, wherein said hydraulic control circuit includes a line for supplying a lubricating system.

8. The control system according to claim 1, wherein said hydraulic control circuit includes a line connected with an oil reservoir, said line includes a one-way valve means permitting flow only toward said reservoir.

9. An improved control system for an infinitely variable transmission for transmitting the power of an internal combustion engine mounted on a vehicle, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a pump for supplying oil, a transmission ratio control valve responsive to engine speed for controlling the oil and for shifting the disc of the primary pulley to change the transmission ratio, and a pressure regulator valve responsive to the transmission ratio for increasing the line pressure of the hydraulic circuit with increase of the transmission ratio, wherein the improvement comprises:

first means comprising a throttle position sensor for detecting the torque of said engine and an electronic circuit responsive to an output signal of the throttle position sensor for producing a control signal proportional to said torque;

second means responsive to said control signal for operating said pressure regulator valve so as to increase the line pressure with increase of the torque;

said second means comprises a hydraulic control circuit for applying a part of drain oil to said pressure regulator valve and a solenoid operated valve responsive to said control signal for controlling the oil passing through said hydraulic control circuit and for regulating the line pressure;

said pressure regulator valve is displaceably mounted and is formed with a recess and a surface, the latter being perpendicular to a direction of displacement of the pressure regulator valve;

said hydraulic control circuit variably communicates with said hydraulic circuit at line pressure at said pressure regulator valve via said recess in the latter in a range of displaceable positions of the pressure regulator valve for receiving a variable pressure portion of oil from said hydraulic circuit, said hydraulic control circuit extends to said surface of said pressure regulator valve for biasing the latter so as to move said recess relative to said hydraulic circuit and said hydraulic control circuit;

said hydraulic control circuit includes a line connected with an oil reservoir, said line includes a one-way valve means permitting flow only toward said reservoir.

* * * * *